Aug. 29, 1933.   A. ALLEN   1,924,087
METHOD AND MEANS FOR MEASURING AND INDICATING PROPERTIES OF CONDUCTORS
Filed Sept. 29, 1931   2 Sheets-Sheet 1
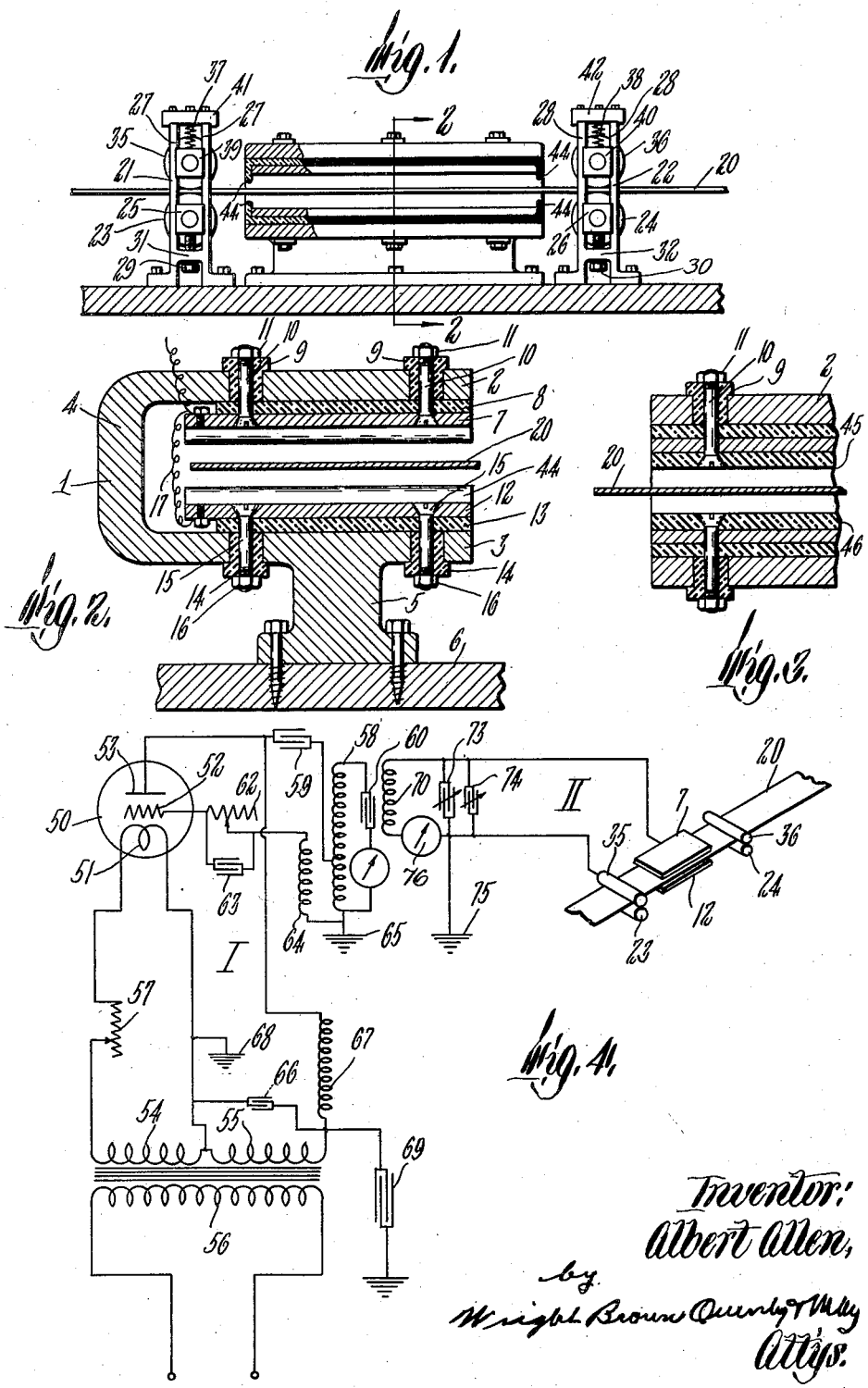

Aug. 29, 1933.  A. ALLEN  1,924,087
METHOD AND MEANS FOR MEASURING AND INDICATING PROPERTIES OF CONDUCTORS
Filed Sept. 29, 1931    2 Sheets-Sheet 2
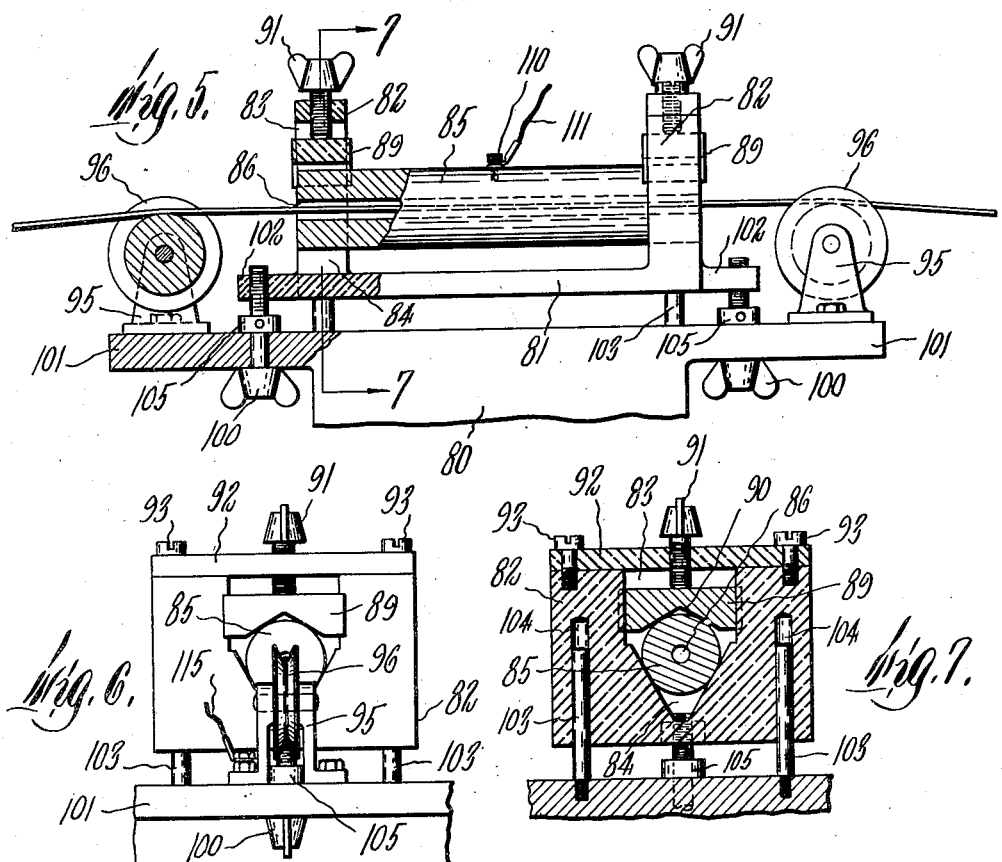
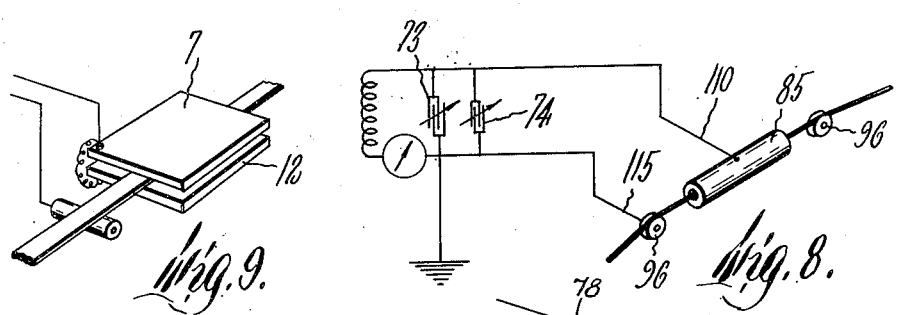
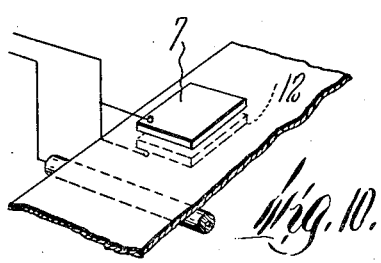
Inventor:
Albert Allen,
by
Wright, Brown, Quinby & May
Attys.

Patented Aug. 29, 1933

1,924,087

UNITED STATES PATENT OFFICE 1,924,087

METHOD AND MEANS FOR MEASURING AND INDICATING PROPERTIES OF CONDUCTORS

Albert Allen, Winchester, Mass., assignor to Atlantic Precision Instrument Company, Malden, Mass., a Corporation of Massachusetts Application September 29, 1931
Serial No. 565,890

12 Claims. (Cl. 175—183)

In my Patent No. 1,708,074 granted April 9, 1929, for Indicating and controlling method and mechanism for paper making machines and the like, is disclosed and claimed a method and mechanism for indicating the weight or other property of products of a generally non-conducting or dielectric nature and whereby the running weight or other property may be indicated as the material in continuous form is progressively related to the mechanism. For this purpose the material is passed between spaced plates of an electrical condenser so as to form a portion of the dielectric therebetween, variations in the running weight or other property of the material between the plates which effect its dielectric nature from time to time causing corresponding variations in the capacity of the condenser, and such variations in capacity causing corresponding variations in an indicator, whereby its indications are responsive to the running property of the material.

The present invention relates to a modification of this general method and apparatus by which properties of an electroconductive material may be similarly determined. To this end the material to be measured is utilized as one plate of the condenser and is related progressively, if desired, to another conducting plate of fixed area, and spaced therefrom as the other plate of the condenser. This condenser plate which forms a part of the apparatus and with which the material to be measured is associated may take various forms, depending, for example, on the particular cross section of the material to be measured and to the particular measurement which it is desired to make. Thus when measuring wire for uniformity of cross sectional area and roundness the plate may be a tube through the center of which the wire is passed.

For measuring sheet material the plate may be divided into two parts, these parts being positioned on opposite sides of the sheet material. When it is desired to measure caliper, these two parts may be of substantially less width than the material so that width variations in the material will not be effective to change the capacity of the condenser. When width variations are to be recognized the plate parts will be wider than the material. The use of two plate portions, where sheet material is being measured, rather than the use of a single plate on one side only may be of advantage in order to minimize the effects which might otherwise be produced due to changes in spacing between the plate and material due to bodily movement toward and from the fixed plate of the moving material, which effects might easily be of such magnitude as to dwarf the actual variations in the quantities sought to be measured. By this arrangement any change of spacing between this material and one plate portion produces a corresponding change of spacing opposite thereto between the material and the other plate portion, assuming that the thickness of the material remains unchanged. While capacity variations due to changes in spacing between condenser plates are not strictly proportional to such changes, the capacity increasing with decreased spacing at a more rapid rate than it decreases with decreased spacing, yet by minimizing the lateral motion of the material as it passes between the plate portions, and by suitable proportioning and placing of these plate portions, the error due to such lateral motion of the material may be held so small that the instrument indications are reliable within commercial limits. Since the dielectric constant of the atmosphere and any other dielectric between the plates and material is substantially constant, and the spacing between the plates and material varies with varying mass, which in general is a function of the caliper of the material when it is of the full size of the plates, the indication may be made in terms of caliper or running weight.

Where the sheet material is sufficiently flexible it may be passed partly about a supporting roller, a single curved plate spaced from the roller surface and between which and the roller the material passes being used as the fixed condenser plate cooperating with the material as the other plate.

This application is a continuation in part of my application Serial No. 281,578, filed May 29, 1928.

For a more complete understanding of this invention, reference may be had to the accompanying drawings in which Figure 1 is a side elevation partly broken away of a portion of an apparatus illustrating this invention.

Figure 2 is a section on line 2—2 of Figure 1 but drawn to a larger scale.

Figure 3 is a section similar to a portion of Figure 2, but showing a modified construction.

Figure 4 is a diagram of the apparatus.

Figure 5 is a fragmentary side elevation of a condenser for use in testing wire.

Figure 6 is an end elevation of the same.

Figure 7 is a section on line 7—7 of Figure 5.

Figure 8 is a fragmentary diagrammatic view showing the use of the condenser of Figures 5 to 7 inclusive.

Figures 9 and 10 are diagrammatic perspectives similar to a portion of Figure 4 but showing divided condenser plates wider and narrower, respectively, than the sheet material being measured.

Figure 11 is a diagrammatic perspective showing another manner of handling sheet material for measuring.

Referring to Figures 1 to 4 inclusive, at 1 is indicated a support or stand generally U shape having an upper horizontal arm 2 spaced from a lower horizontal arm 3 by means of the vertical web 4. The arm 3 is shown as provided with a supporting web portion 5 which is shown as fixed to a table 6. Supported on the under face of the horizontal arm 2 is a metal plate 7 insulated from the arm 2 by means of the strip of insulation 8 and the insulating sleeves 9 surrounding the securing screws 10 provided with nuts 11 on their upper ends. Similarly a conducting plate 12 is supported on the upper face of the portion 3 being insulated therefrom by the insulation 13 and the insulating sleeves 14 through which the securing screws 15 are passed, nuts 16 fixing these parts rigidly together. The plates 7 and 12 are thus insulated from the support 1 and are electrically connected together as by means of the conductor 17. These plates are thus arranged in spaced parallel relation and together form one plate of a condenser, the other plate of which comprises the material to be measured which is placed therebetween and out of contact with both as shown at 20. The condenser plate formed by the two plates 7 and 12 substantially surrounds the material, and at a substantially uniform air gap, the edges only of the material being tested having no portion of the opposite plate positioned opposite thereto and when testing sheet material as shown this represents a very small part of the total superficial area of the material. Where variations in width as well as thickness are to be recognized the plates 7 and 12 may be substantially wider than the material, as is shown in Figure 9. Where caliper variations only are to be recognized the plates may be substantially narrower than the material, as is shown in Figure 10. In order to support and guide the material to be tested so that it may be caused to pass progressively between the plates 7 and 12, pairs of supporting and guiding rolls are shown in Figure 1 at 21 and 22. The lower rolls 23 and 24 are journaled in bearings 25 and 26 fixed between ways 27 and 28 in a roller stand. While these bearings 25 and 26 are fixed, they may be adjusted vertically in these stands, for this purpose adjusting bolts 29 and 30 being shown. These bolts engage the journal bearings 25 and 26 and are threaded through horizontal webs 31 and 32 in the roller stands. By this means the lower face of the material 20 is supported in substantially a fixed position relative to plates 7 and 12. The upper rollers 35 and 36 are slidably mounted between the ways 27 and 28, respectively, and are normally held pressed toward the lower rolls 23 and 24 as by means of the springs 37 and 38 which react between the upper faces of their bearing boxes 39 and 40 and cap plates 41 and 42 of the roller stands. Thus the lower face of the material passing between the plates is maintained substantially at a fixed distance from each of the plates 7 and 12 while the upper face of the material may vary in its position dependent on the thickness of the material. The variations in thickness of the material determine the spacing between the upper face of the material and the lower face of the plate 7, thus to vary correspondingly the capacity of the condenser comprising such material, the upper plate and the atmosphere therebetween. Since the lower face of the material 20 is maintained substantially at a constant distance from the upper face of the plate 12 the capacity of the condenser formed by the plate 12, the material 20, and the dielectric atmosphere therebetween is substantially constant. However, as it is impossible to maintain the lower face of the material exactly in the same spaced relation from the lower plate, any variations of this spacing is largely corrected by a similar variation in the opposite direction due merely to the change of position between the upper face of the material 20 and the plate 7. Thus should the lower face of the material 20 approach slightly closer to the upper face of the plate 12 than normal, the upper face of the material 20, provided the thickness of the material remains the same, will recede from the adjacent face of the plate 7 to the same extent. While the increase of capacity between two spaced plates where their spacing is diminished is at a greater rate than the decrease of capacity due to an increase of spacing between the plates, yet where this spacing variation is small with relation to the total spacing of the plates, this difference is so small as to introduce no errors of sufficient magnitude to prevent the total capacity indication of the apparatus including both plates 7 and 12 from providing an indication of the mass or thickness of the material passing between the plates to commercial degrees of accuracy.

In order to guard against accidental contact between the material 20 and either of the plates 7 or 12, the insulating strips 8 and 13 may have the edges bent around the edges of the plates 7 and 12, respectively, to project beyond the adjacent faces thereof as shown at 44 in Figure 1, or, as shown in Figure 3, the adjacent faces of the plates 7 and 12 may be covered by insulating plates 45 and 46. When the construction shown in Figure 3 is employed these plates 45 and 46, as well as the atmosphere between the plates and material form the dielectric of the condenser.

While the capacity of the compound condenser thus formed may be measured and indicated in any suitable manner, a very sensitive and accurate mechanism for the purpose is that shown diagrammatically in Figure 4, this being of the same general nature as that disclosed in Patent No. 1,708,074 hereinbefore referred to. In accordance with this general method, the condenser comprising the plates and the material passing therebetween with the interposed atmospheric dielectric is used as the tuning element of the high frequency oscillatory electric circuit which is tuned closely to resonance with another high frequency oscillatory circuit by the oscillations in which current flow is excited in the first circuit dependent in amount on the nearness to resonance between the two circuits, this nearness to resonance being determined by the capacity of the tuning condenser including the two plates and the material passing therebetween.

Referring to Figure 4, I represents diagrammatically a high frequency primary oscillatory circuit, while II represents the secondary high frequency oscillatory circuit the natural frequency of which is varied by variations in the capacity of the two plates 7 and 12 and the material 20 to be tested. While these circuits may be of any suitable form, as shown they are of the type more completely described and claimed in the Field Patent No. 1,813,488 for Oscillatory circuits and method of compensating for voltage changes impressed thereon, granted July 7, 1931, as such a circuit may be made inherently self compensating for considerable changes in voltage of a commercial alternating current power source. This system, as shown, comprises a thermionic tube 50 used to excite oscillations in the primary circuit I, this tube having a filament 51, a grid 52 and a plate 53. The filament and plate are shown as deriving their energy from the divided secondary 54 and 55, respectively, of a transformer having its primary 56 connected to any suitable source of commercial alternating current such as the ordinary 60-cycle lighting current.

The current for the filament is shown as controlled by the rheostat 57. The plate circuit is shown as having therein an inductance 58, and capacities 59 and 60, and the grid circuit is shown as having therein a variable resistance 62 shunted by a condenser 63 and connected through an inductance 64 in coupled relation to the plate inductance 58 with the ground at 65. The filament circuit is grounded at 68. The transformer secondary 55 is shunted by the fixed condenser 66, and the plate circuit is provided with a radio frequency choke 67 and a radio frequency path to ground through the condenser 69. The secondary circuit II is provided with an inductance 70 in inductive relation to the inductance 58 of the primary circuit I whereby the two circuits are coupled. The secondary circuit II is also provided with tuning condensers 73 and 74, one of which may be a vernier condenser, which shunt the condenser formed by the plates 7 and 12 and the material 20. For convenience the material to be tested is grounded, this being effected as shown through the grounding of one or more of the rollers which guide it between the plates 7 and 12, the roller 35 being shown as grounded. One side of the circuit II is also grounded, a common ground for the material 20 and this circuit being indicated at 75. The high voltage side of the secondary circuit II is connected to the plates 7 and 12. At 76 is shown an instrument of any suitable type, such as a thermo-ammeter, for indicating the current flow in the secondary circuit II. By a suitable adjustment of the tuning condensers the secondary circuit II is brought into such tuning relationship to the primary circuit I that the indicator on the instrument 76 gives a certain desired null indication when material of the normal and desired thickness or mass is in position or traveling between plates 7 and 12. Any variation from the normal then changes the tuning relation between the two circuits by varying the capacity of the condensers 7, 12 and 20 and causes a corresponding change to be made by the pointer of the indicator so that the indicator is continuously responsive to such capacity and variations therein. It is because of the convenience of grounding the material 20, which it might in practice be very difficult to insulate from the ground, that the plates 7 and 12 are shown as mounted on insulating supports as it is quite easy to maintain these plates out of ground connection. It should be understood, however, that this is in no way essential to the operation of the mechanism, it being only necessary that the conductive material should be one plate of a condenser and be related to a fixed condenser plate in such a manner that variations in its mass or thickness shall vary the capacity of the condenser of which the material forms a part.

If desired, and as shown in Figure 11, a material supporting conducting roller 77 may be caused to cooperate with a single conductive condenser plate 78 spaced a fixed distance therefrom to permit the passage of the material to be measured therebetween, the roller 77 and the plate 78 being connected into the circuit in place of the rollers 23 and 35 and the plates 7 and 12, respectively, of Figure 4.

In Figures 5 to 8 inclusive mechanism particularly suitable for measuring wire is illustrated. Referring to these figures, 80 indicates a suitable base which carries a support 81. This support 81 has spaced upstanding wall portions 82 each of which is provided with a central recess 83 opening from its upper end and terminating at its lower end in a V shaped slot 84. These V shaped slots may support a tube 85 of electroconducting material through the central aperture 86 in which the wire to be tested may be passed out of contact with the tube 85, the tube and wire forming opposite plates of the condenser. For supporting the tube in the wall members 82 clamping plates 89 shown as vertically slidable in the recesses may be provided, these clamping plates each having V shaped recesses 90 to take over the upper portion of the tube 85 and being capable of being pressed in clamping engagement with the tube as by means of the thumb screws 91 threaded through cover plates 92 secured to the upper edges of the wall members 82 as by means of screws 93. This mounting of the tube permits tubes of various sizes to be clamped in position so as to provide for handling wire or rods (referred to generally as wire) of differing diameters with their faces out of contact with the tube but in sufficiently close relation thereto to give the desired sensitivity of measuring action.

On opposite ends of the base 80 opposite to the ends of the tube 85 are journaled on suitable bearing posts 95 grooved rollers 96 so positioned as to guide the wire through the tube but out of contact therewith. In order to provide for relative adjustment between the guide rollers and the tube to allow for different sizes of tubes the support 81 may be vertically adjustable with relation to the base 80. As shown this is accomplished by thumb screws 100 journaled through extensions 101 of the base 80 and having threaded engagement with ears 102 extending from the end portions of the support 81. Guide pins 103 secured to the base 80 and extending into suitable sockets 104 in the support 81 may be used to limit the motion of the support to substantially vertical adjustment with relation to the base 80. Collars 105 fixed to the thumb screws 100 may be used to prevent these screws from dropping out of the base 80 and to take the weight of the support 81 and the parts carried thereby. As it is a difficult matter to insulate the material being tested, it is preferable that it be grounded and that the tube 85 be insulated from the ground and used as the high potential plate of the condenser. Any suitable parts for supporting this tube may be made of insulating material for this purpose, but as shown the support 81 is so formed. The tube 85 may be provided with a terminal 110 to which the high potential condenser lead 111 may be connected. With this form of apparatus the condenser plate formed by the tube 85 completely surrounds the material being tested and the indication is responsive not only to the diameter of the wire or rod passed therethrough, but also to any lack of roundness which it may possess since both these factors enter into the determination of the capacity between the tested material and the tube 85. This device, therefore, may be used in the nature of a gage to determine whether or not the wire or rod is within the desired tolerance limits both as to roundness and diameter.

In Figure 8 is illustrated the manner in which this tube 85 is connected in parallel with the condensers 73 and 74 of the secondary circuit shown diagrammatically in Figure 4. The grounded side of this circuit may well be connected through the lead 115 to one or both supporting rollers 96 over which the wire or rod to be tested is passed as shown in this figure.

From the foregoing description of certain embodiments of this invention, it should be evident to those skilled in the art that various changes and modifications might be made without departing from the spirit or scope of this invention as defined by the appended claims.

I claim:

1. The method of measuring a property of electro-conducting material, which comprises relating such material spaced from a condenser plate in a manner to cause the capacity of the condenser comprising said material, and plate, to be dependent on the amount of such property, and indicating such capacity in terms of such property.

2. An apparatus comprising a conducting plate, means for supporting moving conducting material to be tested spaced from said plate and out of conductive relation thereto, and visual indicating means continuously responsive to the electrical capacity and variations therein of the condenser formed by such material and plate.

3. Apparatus comprising a conducting plate, means for supporting sheet conducting material spaced from and in substantially parallel relation to said plate and with a dielectric therebetween, the face of said material remote from said plate being at a predetermined distance from the adjacent face of said plate, and means responsive to the capacity of the electric condenser formed by said plate, the material, and the dielectric therebetween for indicating the mass of that portion of said material associated with said plate.

4. Apparatus comprising an electro-conducting plate, means for supporting moving sheet conducting material to be tested so that successive portions thereof are presented in spaced parallel relation to said plate while the face of said material remote from said plate is maintained at a predetermined distance therefrom, there being a dielectric between said plate and sheet, and means responsive to the capacity of the condenser comprising said plate, the sheet material presented opposite thereto at any instant, and the dielectric therebetween for indicating the running weight of said material.

5. Apparatus comprising a pair of electrically connected electro-conducting plates, means for supporting said plates in parallel opposed spaced relation, means for supporting traveling electro-conducting sheet material between and spaced from said plates, and means responsive to the capacity of said plates, and the material between them at any instant for indicating the running weight of the material.

6. Apparatus comprising a pair of electrically connected electro-conducting plates, means for supporting said plates in parallel opposed spaced relation, means for supporting traveling electro-conducting sheet material between and spaced from said plates and with one face thereof maintained at fixed distances from each of said plates, and means responsive to the capacity of said plates, and the material between them at any instant for indicating the running weight of the material.

7. Apparatus comprising a pair of electrically connected electro-conducting plates, means for supporting said plates in parallel opposed spaced relation, means for supporting traveling electro-conducting sheet material between and spaced from said plates, means for preventing contact between said plates and material and means responsive to the capacity of said plates, and the material between them at any instant for indicating the running weight of the material.

8. Apparatus comprising a frame, a pair of electro-conducting plates insulated from and supported by said frame in opposed fixedly spaced parallel relation, means for supporting a grounded length of an electro-conducting material between and spaced from said plates and at a fixed distance from one of said plates, and means responsive to the capacity of said plates and conducting material therebetween at any instant for indicating the weight of said material between said plates at any instant, said indicating means including an oscillatory electric circuit having a high potential portion connected to said plates and a grounded portion.

9. In an apparatus of the class described, a support, a pair of electro-conducting plates carried in opposed spaced relation by said support, pairs of guide rollers at opposite edges of said plates for guiding material to be tested between and out of contact with said plates, means for supporting a corresponding roller of each pair in normally fixed position to define a fixed spacing of one side of said material between said plates, and means for yieldingly supporting the other roller of each pair, whereby material of variable thickness may be passed between said plates while one face thereof is maintained in the same spaced relationship to both of said plates.

10. An apparatus comprising a conducting member, means for supporting conducting material spaced from said member with a substantially uniform air gap, said member substantially surrounding said material, and indicating means continuously responsive to the electrical capacity and variations therein of the condenser formed by said material and member for indicating a property of said material.

11. An apparatus comprising a tube of conducting material, means for directing a wire to be passed through said tube and spaced therefrom, and indicating means continuously responsive to the electrical capacity and variations therein between said wire and tube.

12. An apparatus comprising a roller over which electro-conductive sheet material may be passed, an electro-conducting plate spaced from said sheet material where it passes over said roller and at a fixed distance from said roller, and an indicator continuously responsive to the capacity and variations therein between said plate and material.

ALBERT ALLEN.